UNITED STATES PATENT OFFICE.

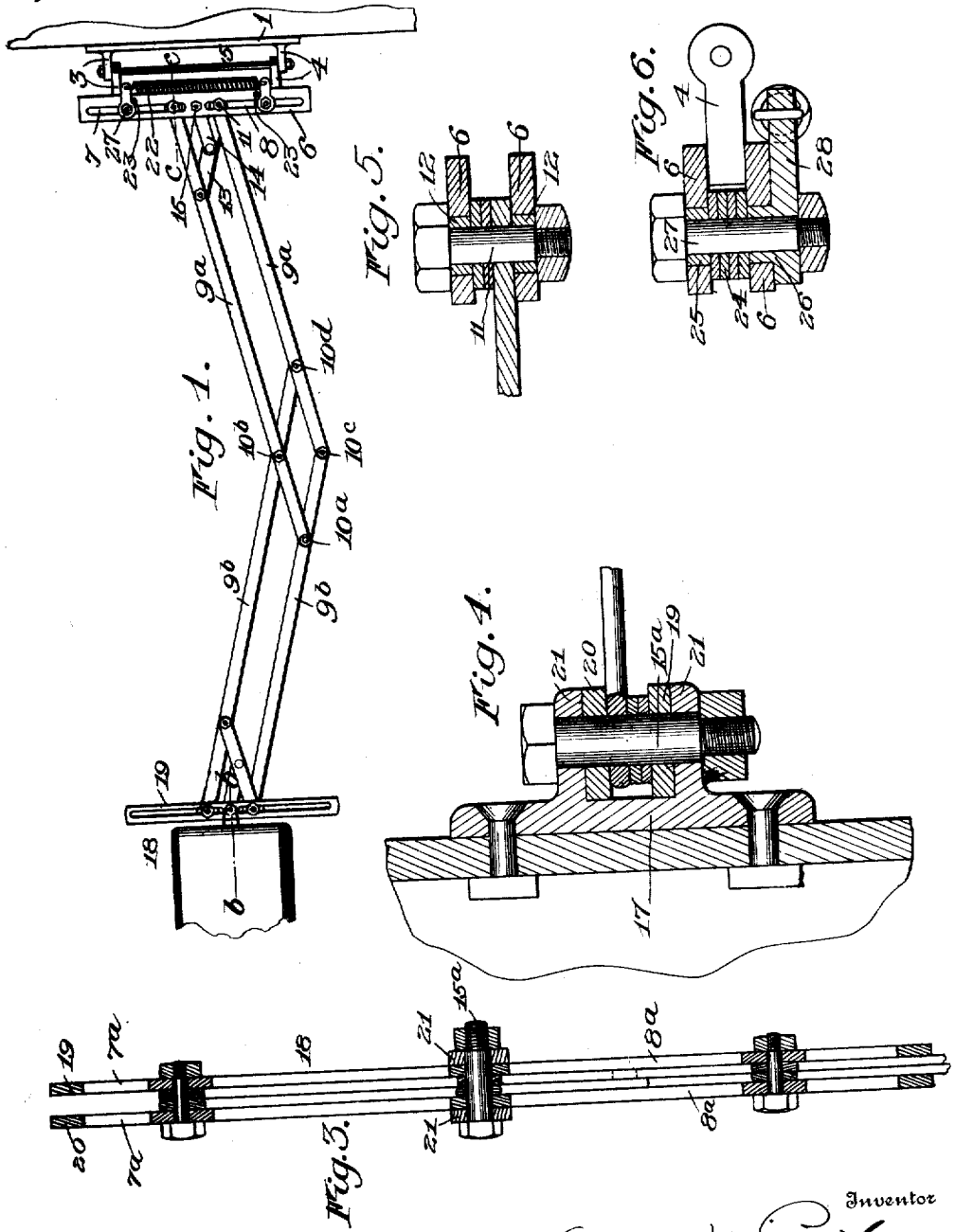

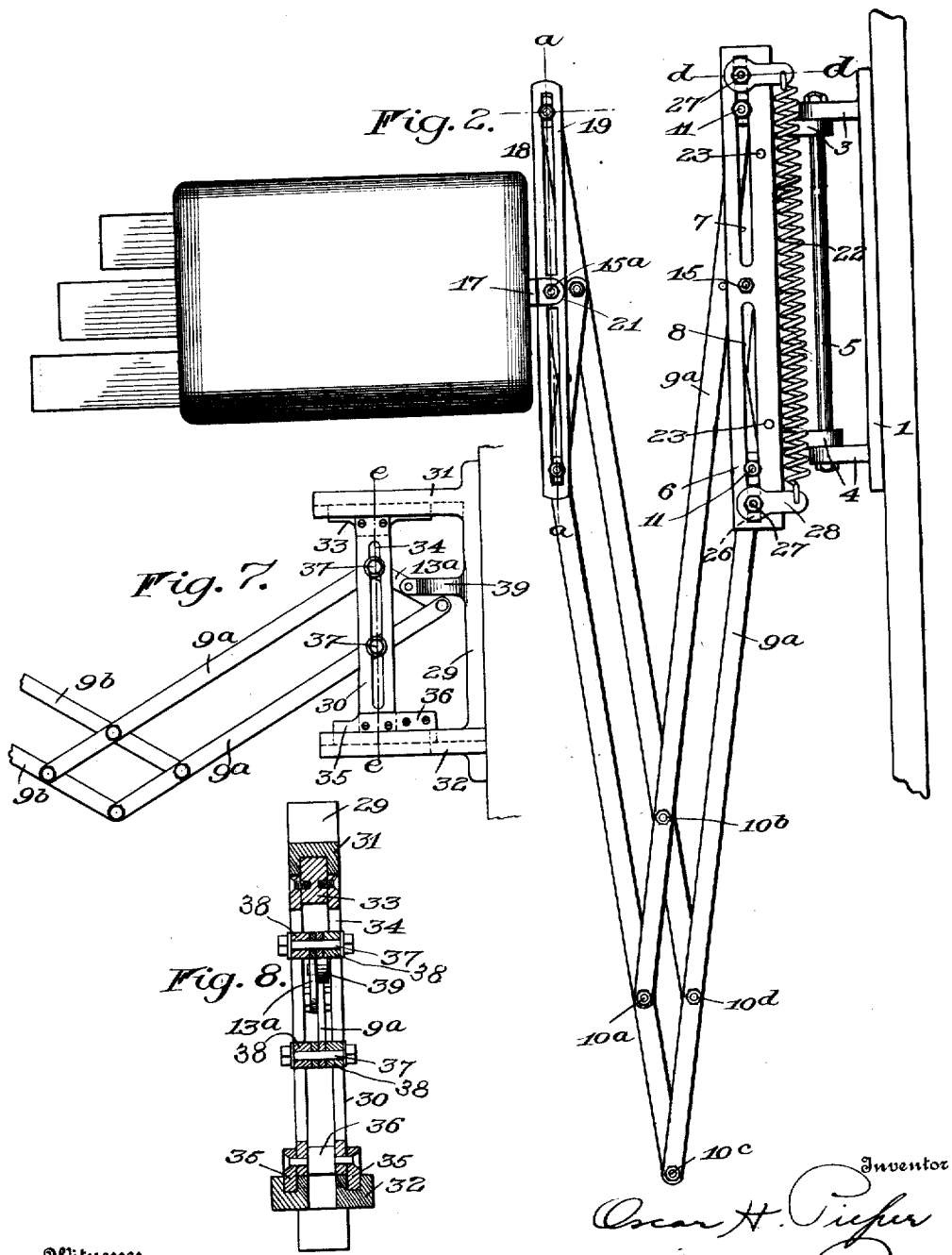

OSCAR H. PIEPER, OF ROCHESTER, NEW YORK.

EXTENSIBLE BRACKET.

No. 913,049.  Specification of Letters Patent.  Patented Feb. 23, 1909.

Application filed June 19, 1907. Serial No. 379,691.

*To all whom it may concern:*

Be it known that I, OSCAR H. PIEPER, of Rochester, in the county of Monroe and State of New York, have invented certain new and useful Improvements in Extensible Brackets; and I do hereby declare the following to be a full, clear, and exact description of the same, reference being had to the accompanying drawings, forming a part of the specification, and to the reference-numerals marked thereon.

This invention relates to extensible brackets of the type in which a plurality of series of parallel links are connected so as to permit a supported element to be moved to and from a supporting element and, without the use of weights or springs, to be maintained in any position to which it may be adjusted; one object of the invention being to provide a bracket in which the links are so connected to the supporting and the supported members that a stronger bracket is secured; and a further object being to prevent the supported element being accidentally moved with too great a force against the supporting element.

To these and other ends the invention consists in certain improvements and combinations of parts all as will be hereinafter more fully described, the novel features being pointed out in the claims at the end of the specification.

In the drawings: Figure 1 is a side view of a bracket embodying my invention, arranged in extended position. Fig. 2 is a like view showing it collapsed and enlarged. Fig. 3 is a section on line $a$—$a$ of Fig. 2, through the supported member. Fig. 4 is a section on line $b$—$b$ of Fig. 1, through the pivotal connection. Fig. 5 is a section on line $c$—$c$ of Fig. 1. Fig. 6 is a section on line $d$—$d$ of Fig. 2 of the guide member of the supporting element detached from the attaching member. Fig. 7 is a side view of the supporting member of another bracket embodying my invention, and Fig. 8 is a section on line $e$—$e$ of Fig. 7.

The bracket herein shown comprises a supporting member and a supported member connected by a link system.

In the embodiment shown in Figs. 1 to 6 the supporting element comprises an attaching member 1 and a guide member pivotally connected to the former, as by perforated ears 3 and 4 through which pass the pivot rod 5. The guide member has two vertical guides which are alined with each other and are preferably formed by two parallel strips or plates 6, each having two vertical guides or slots 7 and 8, the walls of the upper slots forming one guide and the walls of the lower ones forming the other. This link system preferably comprises two pairs of parallel links pivotally connected at $10^a$, $10^b$, $10^c$ and $10^d$ in such a manner that the members forming each pair move in parallel lines the pivots $10^a$ and $10^d$ being located an equal distance from the pivots $10^b$ and $10^c$. Each link of the inner pair has its free end arranged to turn on one of the pivot pins 11 which in this instance are in the form of bolts, each carrying a pair of guide blocks 12 arranged to slide in the opposite slots of one of the guides 7 or 8. A suitable means is provided for causing the members of the inner pair to move in opposite directions to and from the center of the guide member and this means preferably comprises a short link 13 connecting the members, preferably by turning at one end on the slidable bolt 11 of the lower link and at its other end secured to the upper link a distance from the pivot $10^b$ thereof equal to the distance of the bolt 11 from the pivot $10^d$. The short link 13 is connected with the supporting member between the links by a short link 14, which for this purpose is pivoted at one end to link 13 intermediate of the ends of the latter and at the other end on bolt 15 connecting the flanges 6 at a point between the guides 7 and 8. The other end of the link system has secured thereto the supported member which preferably comprises an attaching member 17 and a guide member 18 consisting of two strips or plates 19 and 20 arranged in spaced relation and each provided with two vertical slots or guides $7^a$ and $8^a$ as on the supporting member, the links $9^b$ being in this instance connected thereto in the same manner as the links $9^a$ connected to the supporting member, except that the bolt $15^a$ is longer and passes through two ears 21 on the attaching member 17 to secure together the two parts of the supported member, the strips engaging the front wall of the attaching plate in such a manner as to prevent their movement on the plate.

As the bracket is at times collapsed with a great deal of force, it is desirable to prevent jar both of the bracket and of the element supported thereby, and for this reason I employ one or more, preferably two, yielding buffers, for engaging the links of the system and retarding their movement. In the present embodiment the buffers are movable on the guides of the supporting member and are preferably connected by a coil spring 22 which tends to move them toward each other but whose action is limited by stops 23 arranged in the path of the buffers. Each buffer in the present instance comprises a series of washers 24 or other spacing devices arranged between two guide blocks 25 and 26 and connected therewith by a bolt 27. The guide blocks 25 and 26 move in the slots 7 and 8 and one of them at its outer end is provided with a laterally and rearwardly extending arm 28 to which the spring 22 is secured.

In Figs. 7 and 8 I have illustrated another embodiment of the invention, the supported member which is constructed in the same manner as the supporting member not being shown. The supporting member in this embodiment comprises an attaching member 29 and a guide member 30. The attaching member is formed to permit the guide member to move horizontally thereon and for this purpose is provided with a pair of horizontal arms 31 and 32, the lower one 32 being bifurcated to permit the link system to partake of its movements; while the guide member comprises two strips connected at their upper ends by a cross piece 33 slidable in the upper arm 31 and each having a vertical slot 34 to form the guide for the link system, and a cross piece 35 at its lower end to move in a longitudinal groove in one of the members of the lower arm 32, the rear ends of the cross pieces being connected by a block 36 to tie the lower ends of the strips together. The link system as in the other embodiment, comprises four links 9ª and 9ᵇ arranged in pairs, pivotally connected together, and each carrying a sliding pivot pin 37 having guide blocks 38 working in the slot 34. The members of each pair are connected by a short link 13ª which is pivoted to rigid arm 39 extending horizontally from the attaching plate 29 at a point between the two sliding connections.

It will be noted that in both embodiments, the link system is pivotally connected to the supporting and the supported member, and has a sliding connection with the said members on opposite sides of its pivotal connection. This construction permits the use of a lighter supporting and supported member as the strain on said members is distributed on opposite sides of the pivotal connections and not at one end of the members.

I claim as my invention:

1. In an extension bracket, a supporting and a supported member, and a link system pivotally connected to each of said members and having sliding connection with each upon opposite sides of each pivotal connection.

2. In an extensible bracket, a supporting and a supported member, a link system connecting said members and embodying two links each having sliding connection with one of said members, and a link pivotally connected to said two links and connected with the said member at a point between the two links.

3. The combination with two pairs of parallel links, each pair being pivoted to the other so that its members move in parallel lines, of a supporting and a supported member each having guides thereon, in which the free ends of a pair of links move, and short links each connecting the members of a pair of parallel links and connected to the supporting or supported member between the parallel links.

4. The combination with two pairs of parallel links, each pair being pivoted to the other so that its members move in parallel lines, of a supporting and a supported member each having guides thereon in which the free ends of a pair of links move, short links each connecting the members of a pair, and links each connecting a short link and the supporting or the supported member between the parallel links.

5. In an extensible bracket, a supporting and a supported member, one of which has a guide, a link system connecting said members and having a link movable on the guide, and a yielding buffer also movable on the guide.

6. In an extensible bracket, a supporting and a supported member, a link system connecting said members and embodying a link guided on one of said members, and a yielding buffer engaged by the link.

7. In an extensible bracket, a supporting and a supported member, a link system connecting said members and embodying a pair of links guided on one of said members, a pair of buffers engaged by the pair of links and a single spring acting on both buffers and permitting them to yield.

8. In an extensible bracket, a supporting and a supported member, one of which has two guide ways thereon, and a link system embodying a pair of links movable on the guide ways, a pair of buffers also movable on the guides and adapted to be engaged by the pair of links, a single spring acting on both buffers, and a stop for limiting the movement of the buffers on the guides.

9. In an extensible bracket, a supporting and a supported member, one of which comprises two spaced parallel strips provided with slots, a link system connecting the members and embodying a pair of links arranged between the strips and working in the slots, a pair of buffers adapted to be engaged by the levers, working in the slots and having arms extending therefrom, and a spring connecting the arms.

OSCAR H. PIEPER.

Witnesses:
H. H. SIMMS,
RUSSELL B. GRIFFITH.